United States Patent [19]

Nordlund

[11] Patent Number: 4,564,169

[45] Date of Patent: Jan. 14, 1986

[54] FLUID ACTUATOR FOR STEPWISE REGULATION OF VALVES

[75] Inventor: Sven Nordlund, Vällingby, Sweden

[73] Assignee: WM Regler AB, Vällingby, Sweden

[21] Appl. No.: 653,269

[22] PCT Filed: Feb. 10, 1984

[86] PCT No.: PCT/SE84/00048

§ 371 Date: Sep. 19, 1984

§ 102(e) Date: Sep. 19, 1984

[87] PCT Pub. No.: WO84/03128

PCT Pub. Date: Aug. 16, 1984

[30] Foreign Application Priority Data

Feb. 11, 1983 [SE] Sweden ............................ 8300756

[51] Int. Cl.[4] .......................................... F16K 31/163

[52] U.S. Cl. .................................. 251/58; 251/63.4; 92/138

[58] Field of Search ..................... 251/58, 59, 60, 62, 251/63, 64, 63.4, 250; 92/138

[56] References Cited

U.S. PATENT DOCUMENTS 4,029,290 6/1977 Karpenko ........................... 251/58

4,087,074 5/1978 Massey et al. ....................... 251/58

4,467,833 8/1984 Satterwhite et al. ............. 251/63.4

FOREIGN PATENT DOCUMENTS 551099 3/1923 France ................................. 251/58

*Primary Examiner*—James C. Yeung
*Attorney, Agent, or Firm*—Sughrue, Mion, Zinn, Macpeak and Seas

[57] ABSTRACT

In a pressurized operated actuator (1) for stepwise regulation of valves between at least three distinct positions, one end-wall has been removed and replaced with an auxiliary actuator (19) having a piston (21) whose piston area exceeds the sum of the areas of the conventional pistons (5 and 6) of the firstmentioned actuator. The piston (21) of the auxiliary actuator has a piston rod (22) which extends into the cylinder chamber (**2*a*) of the actuator. Its stroke equals half the length of the stroke of the rods (7 and 8) of two conventional pistons (5 and 6). The firstmentioned piston rod (22) limits the movement of the pistons (5 and 6**) of the actuator in a direction away from one another. In this way, there can be obtained a distinct intermediate position for the rotary settings of the actuator.

1 Claim, 4 Drawing Figures

FLUID ACTUATOR FOR STEPWISE REGULATION OF VALVES

FIELD OF INVENTION

The present invention relates to a fluid actuator for the stepwise regulation of valves between at least three different positions, such as between 0°, 90° and 180° and back in a ball valve, cock valve or the like, said fluid actuator comprising a cylinder which is defined by two end-walls and in which two pistons are arranged for movement towards and away from one another, each of said pistons having arranged axially therealong a gear-rack having teeth which mesh with a toothed wheel mounted on an actuating member which is journalled for rotation in and passes sealingly through at least one cylinder wall, so as to extend transversely to the direction of movement of the pistons. At least three fluid supply and discharge passages are provided, of which a first opens out between the pistons, a second opens out in one end-wall of the cylinder opposite the first piston, and a third opens out in the second end-wall of the cylinder opposite the second piston.

Fluid actuators of this kind have been found particularly useful for regulating valves for industrial purposes. Although the working medium preferred is pressurized air, other working media, such as hydraulic fluids, can also be used.

The actuator is particularly useful, primarily because of its compactness and also because it is able to transfer large regulating forces, despite its small dimensions. The actuator is also particularly reliable in operation.

BACKGROUND ART

An actuator of the aforedescribed kind may be used to execute regulating movements between three or more different and distinct operating positions. Thus, when regulating a valve it is often desired to adjust the valve reliably in both its half-open position, corresponding to a 90° rotation of the valve spindle, and a fully-open position, corresponding to 180° rotation of said spindle. Many hitherto known actuators are not able to satisfy this requirement, since they will only permit the valve to be regulated between a zero or closed position and an end position corresponding to a position in which the valve is fully open or in which the valve spindle has been rotated through 180°. U.S. Pat. No. 4,087,074 (Massey et al) describes an example of a known valve of this kind, which has a return spring coupled to an independent fluid actuated piston to assist in spring compression on the forward stroke.

German Pat. No. 2,405,297 (Kürten) describes an actuator having four pistons in symmetrical arrangements, which is a rather complicated and expensive design.

German Pat. No. 2,508,683 (Yazaki) describes an actuator having, like Massey et al, a spring actuated additional piston, also providing a manually operated wheel for adjusting the end positions.

Consequently, when wishing to make intermediate adjustments, it has either been necessary to make such adjustments manually or to employ other, more complicated solutions, in which mutually different actuators are placed one upon the other, or the like. In certain cases it has been necessary to ignore fluid actuators of the kind described and to employ totally different solutions, for example solutions which require the use of electricity and which in practice greatly increase the costs entailed.

OBJECT OF INVENTION

An object of the present invention is to provide a fluid actuator with which the aforesaid disadvantages are obviated while retaining the reliability of the actuator without drastically increasing the costs.

BRIEF DESCRIPTION OF INVENTION

Accordingly, in its widest aspect, a fluid actuator according to the invention is mainly characterized in that extending through one end-wall of the cylinder is the piston rod of a third piston which is arranged in an adjacent, second cylinder chamber and the area of which exceeds the sum of the areas of the first and second pistons, the length of stroke of the piston rod of the third piston corresponding to half the length of stroke of the first and the second pistons.

By using such an auxiliary cylinder with its associated piston and piston rod, the distance travelled by the first and second pistons when moving away from one another can be readily restricted. In this way, it is possible to limit rotation of the actuating member, operated by the teeth on the pistons, to only 90°, corresponding, for example, to half a turn of the valve spindle.

With the aid of the auxiliary arrangement it is also possible to displace the first and the second pistons from a fully withdrawn position to an intermediate position, as said pistons move towards one another. This corresponds to rotation of the actuating member from a position corresponding to 180° rotation, to an intermediate position corresponding to a 90° rotation, i.e. when regulating the valve, the valve spindle is caused to move from a position corresponding to a full open valve position to a half-open or to a half-closed position. The intermediate position is distinct and accurately defined in both cases, this being achieved by passing the working fluid, via the first passage, to that part of the cylinder chamber located between the two pistons. When the piston rod of the auxiliary piston, through engagement with the first piston, causes the pistons to move towards one another, said piston must consequently work against the pressure applied to the space between the two pistons.

The cylinder end-wall through-passed by the piston rod may form a separate actuating member, which is removeably arranged in the cylinder and which can be exchanged for a conventional cylinder end-wall.

Thus, it is possible to provide, complimentary to a standard device, a separate actuating device which can be mounted in the standard device, simply by removing one end-wall thereof. This device can then be used for more complicated regulating purposes. If it is later deisred to use the device for its original, less complicated purpose, it is only necessary to remove the complimentary, auxiliary device and replace the original end-wall.

The toothed piston rods of standard actuators of the kind intended are normally provided with recesses for accommodating springs, which ensure that the actuating member will return to its zero or closing position should the fluid pressure drop. The piston rods of an actuator according to the present invention may also be designed in this way, i.e. such a safety measure can also be used when utilizing an auxiliary arrangement according to the invention.

An exemplary embodiment of the invention will now be described in more detail with reference to the accompanying drawing.

BRIEF DESCRIPTION OF DRAWING

In this respect, FIG. 1 illustrates the actuator in a starting or zero position, in which none of the cylinder chambers of the actuator contains working medium.

FIG. 2 illustrates the position in which the actuating member has been rotated through 90°.

FIG. 3 illustrates a fully executed stroke, i.e. 180° rotation of the actuating member.

FIG. 4 illustrates, finally, the actuating member after executing a stroke corresponding to rotational movements from 180° to 0°, i.e. without an intermediate stop at a 90° stroke.

DESCRIPTION OF PREFERRED EMBODIMENTS

Figure 1:
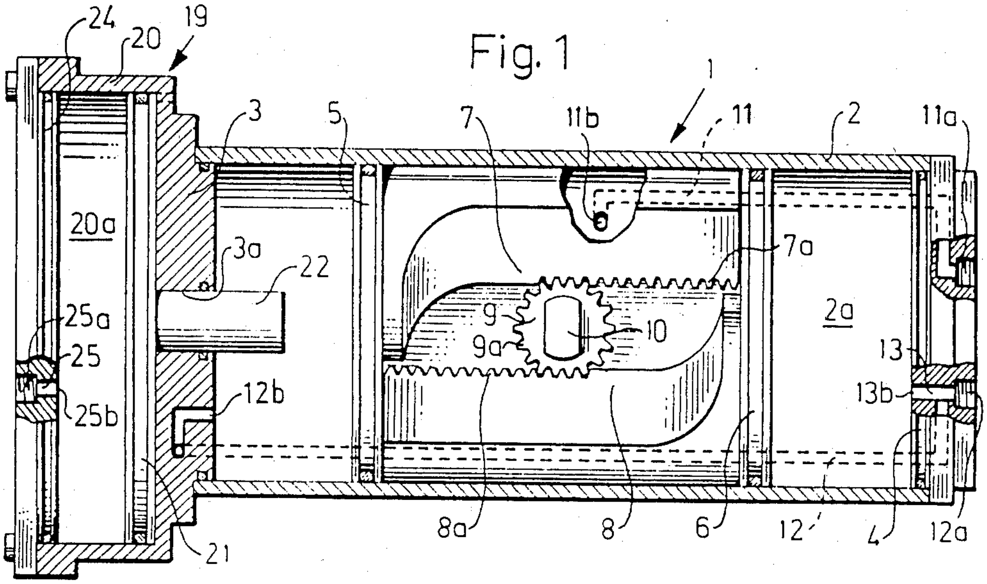
FIGS. 1–4 are all cross-sectional views of a pneumatic actuator according to the invention, the various features thereof illustrating different phases of a regulating sequence.

The illustrated pneumatic actuator 1 for regulating a valve (not shown) comprises a cylinder 2 defined by a first end-wall 3 and a second end-wall 4. Arranged in the cylinder for movement towards and away from one another are two pistons, namely a first piston 5 and a second piston 6. Each of the pistons has an axially extending piston rod 7 and 8, respectively, said piston rods being provided with teeth **7*a*, 8*a*** and are therefore hereinafter referred as the rack parts of the pistons.

The teeth **7*a* and 8*a* engage teeth 9*a* on a toothed wheel 9, which is fitted on an actuating member 10. The actuating member 10 is sealingly journalled in and passes through two mutually opposing side walls of the cylinder 2**. One outwardly projecting part of the actuating member is connected to the valve spindle (not shown) of a control valve (not shown) served by the actuator.

Arranged in the end-wall 4 of the cylinder 2 are screw connectors **11*a*, 12*a* for three passages 11, 12, 13, intended for supplying and discharging pressurized fluid to and from the pressure chambers defined by the pistons of the actuator. The first, 11, of said passages has an orifice 11*b* located in the space between the two pistons 5 and 6. The second, 12, of the passages has an orifice 12*b* located in the end-wall 3 opposite the first piston 5, while the third, 13, of said passages has an orifice 13*b* located in the end-wall 4 opposite the second piston 6**.

In the case of a standard actuator (not shown), the conventional end-wall can be exchanged and replaced with the end-wall 3 of an auxiliary actuator 19 illustrated in the Figures. The auxiliary actuator 19 has a cylinder 20 which defines a cylinder chamber **20*a*, in which a third piston 21 is movable. The third piston 21 has a piston rod 22 which is passed through a bore 3*a* in the end-wall 3. In the terminal position illustrated in FIG. 1, the piston rod 22 extends into the part of the cylinder chamber 2*a* located between the end-wall 3 and the piston 5 through a distance which corresponds to half the length of stroke of the piston 5. Arranged in the end-wall 24 of the auxiliary device, shown to the left of the Figure, is a screw connector 25*a*, for supplying pressurized fluid to the chamber 20*a*, via a passage 25**.

The various pistons, end-walls etc. are provided with seals, which are of a conventional kind and are consequently not described in detail.

The illustratd actuator has the following mode of operation.

FIG. 1 illustrates a starting or zero position, in which the actuating member 10 exhibits a rotary angle of 0°.

Figure 2:
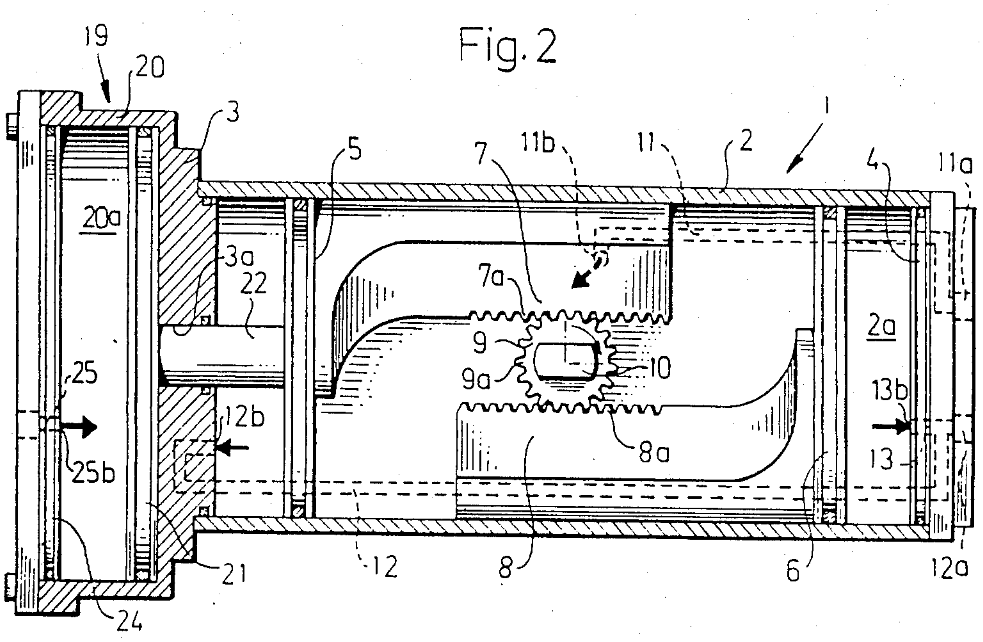

FIG. 2 illustrates how the cylinder chamber **20*a* of the auxiliary actuator 19 is placed under pressure, via the supply passage 25, at the same time as pressurized fluid is supplied to the space between the two pistons 5 and 6, via the passage 11. The pistons 5 and 6 are thus caused to move to the position illustrated in FIG. 2, corresponding to a rotation of 90° of the actuating member 10. Further movement of the actuating member beyond this position is prevented by the piston rod 22. As the pistons 5 and 6 move to the position illustrated in FIG. 2, return fluid passes through the passages 12 and 13**, in the manner indicated by the arrows in said Figure.

Figure 3:
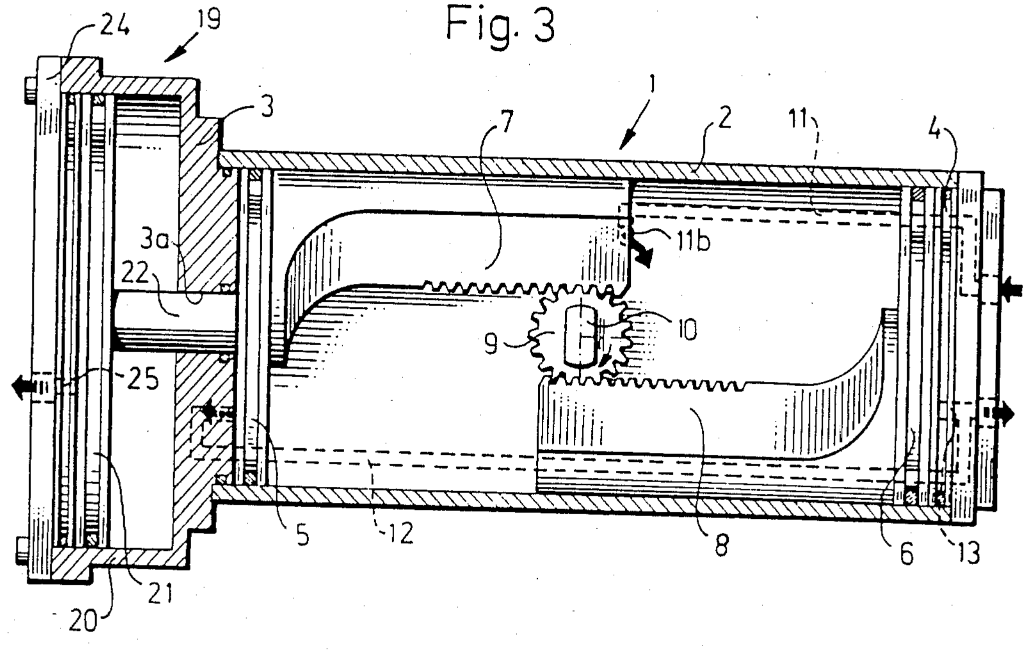

For movement to the 180°-position illustrated in FIG. 3, the pressure in chamber **20*a* of the auxiliary actuator 19 is relieved. The space between the two pistons 5 and 6 is still under pressure, and the pistons move to the position illustrated in FIG. 3. In this case, when the left-hand piston 5 comes into contact with the piston rod 22, it will move said piston rod to the left in FIG. 3. Further return of the working fluid is effected through passages 12 and 13**.

Figure 4:
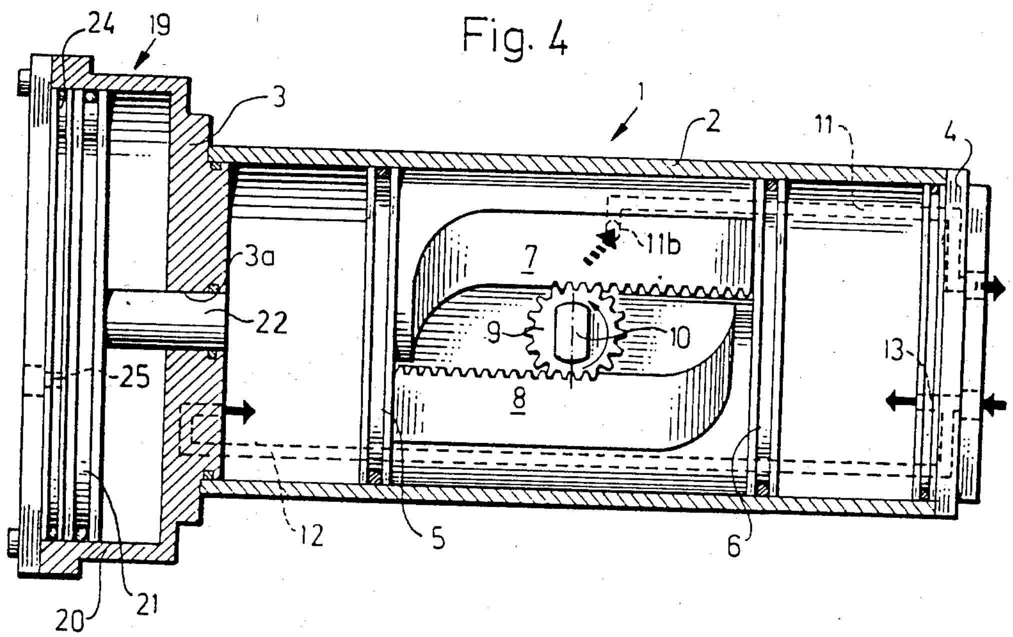

For movement between the 180°-position and the zero-position, the space between the two pistons 5 and 6 is relieved of pressure. Instead, working fluid is supplied via the passages 12 and 13, whereupon the pistons are displaced to the starting position illustrated in FIG. 4.

If, instead, a displacement between the 180°-position, illustrated in FIG. 3, to the 90°-position, illustrated in FIG. 2, is desired, the chamber **20*a* of the auxiliary actuator 19 is placed under pressure, by supplying pressurized fluid to said chamber, via the passage 25. In this case, the piston 21, through the agency of its piston rod 22, will force the piston 5 to the right, this movement being simultaneously transferred to the rack part 8 of the other piston 6, via the toothed wheel 9 of the actuating member 10**.

Thus, a distinct 90°-position can also be obtained upon return movement of the auxiliary actuator piston 21.

INDUSTRIAL APPLICABILITY

When wishing to convert the illustrated actuator to a standard actuator, it is only necessary to remove the auxiliary actuator 19 and to replace the illustrated end-wall 3 provided with a bore for the piston rod 22 with the conventional end-wall of the standard actuator.

I claim:

1. A fluid actuator for the stepwise regulation of a ball valve, cock valve or the like between at least three different and distinct rotational positions, such as 0°, 90° and 180°, said fluid actuator comprising a cylinder (2) having two end walls (3,4), two pistons (5, 6) disposed in the cylinder for movement towards and away from one another, each of said pistons having an axial gear rack (7, 8) with teeth **(7*a*, 8*a*) in mesh with a toothed wheel (9) mounted on an actuating member (10) rotatably journalled in and passing sealingly through at least one cylinder wall to extend transversely to the direction of movement of said pistons, and at least three fluid supply and discharge passages (11, 12, 13)**, a first one of said passages (11) opening out between the pistons, a second one of said passages (12) opening out in one of said end walls (3) of the cylinder opposite a first one of said pistons (5), and a third one of said passages (13) opening out in another of said end walls (4) opposite a second one of said pistons (6), characterized by: a further cylinder chamber (20*a*) defined axially outwardly of said one end wall, a third piston (21) disposed in said further cylinder chamber for movement towards and away from said one end wall, a bore (3*a*) in said one end wall, and a piston rod (22) coupled to said third piston and extending through said bore for movement into and out of a cylinder chamber defined between said one end wall and said first piston, the cross-sectional area of the third piston exceeding the sum of the cross-sectional areas of the first and the second pistons, and the length of stroke of the piston rod of the third piston corresponding to one-half the length of stroke of the first and second pistons, whereby the full extension of the piston rod into said a cylinder chamber establishes a limit stop restricting the movement of the first and second pistons to one-half of their stroke length, and the respective cross-sectional areas of the pistons prevents such limit stop from being overridden.

* * * * *